United States Patent [19]

Mihalik

[11] 4,203,610
[45] May 20, 1980

[54] SCOOTER

[76] Inventor: Nicholas Mihalik, 98-25 65th Rd., Forest Hills, N.Y. 11374

[21] Appl. No.: 949,668

[22] Filed: Oct. 10, 1978

[51] Int. Cl.² .................................................. B62B 7/00
[52] U.S. Cl. ............................................... 280/87.04 R
[58] Field of Search ..................... 280/87.04 R, 87.02

[56] References Cited

U.S. PATENT DOCUMENTS

| | | | |
|---|---|---|---|
| 2,439,556 | 4/1948 | Bancroft | 280/87.04 R |
| 2,486,689 | 11/1949 | Tibores | 280/87.04 R |
| 3,052,481 | 9/1962 | Kaufman | 280/87.04 R |

Primary Examiner—John J. Love
Assistant Examiner—Randall A. Schrecengost
Attorney, Agent, or Firm—Daniel Jay Tick

[57] ABSTRACT

A coupling couples the steering shaft of a scooter to the side strips of the platform thereof. The coupling comprises a pocket-like housing member accommodating the free front ends of side strips and enclosing the side strips and the area between the front ends thereof. A U-shaped bracket member is accommodated in an indentation in the sleeve of the steering shaft, passes around the sleeve and is affixed at its free ends to the housing member.

2 Claims, 6 Drawing Figures

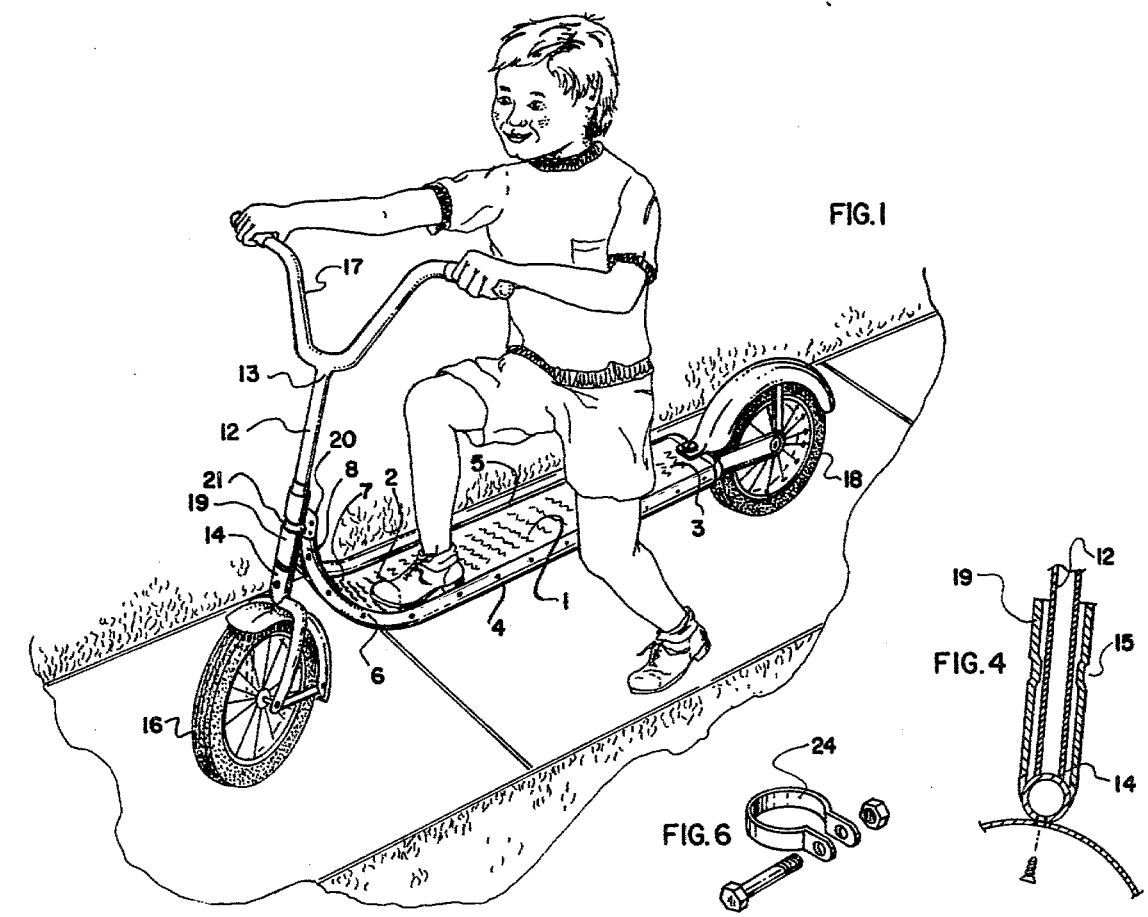
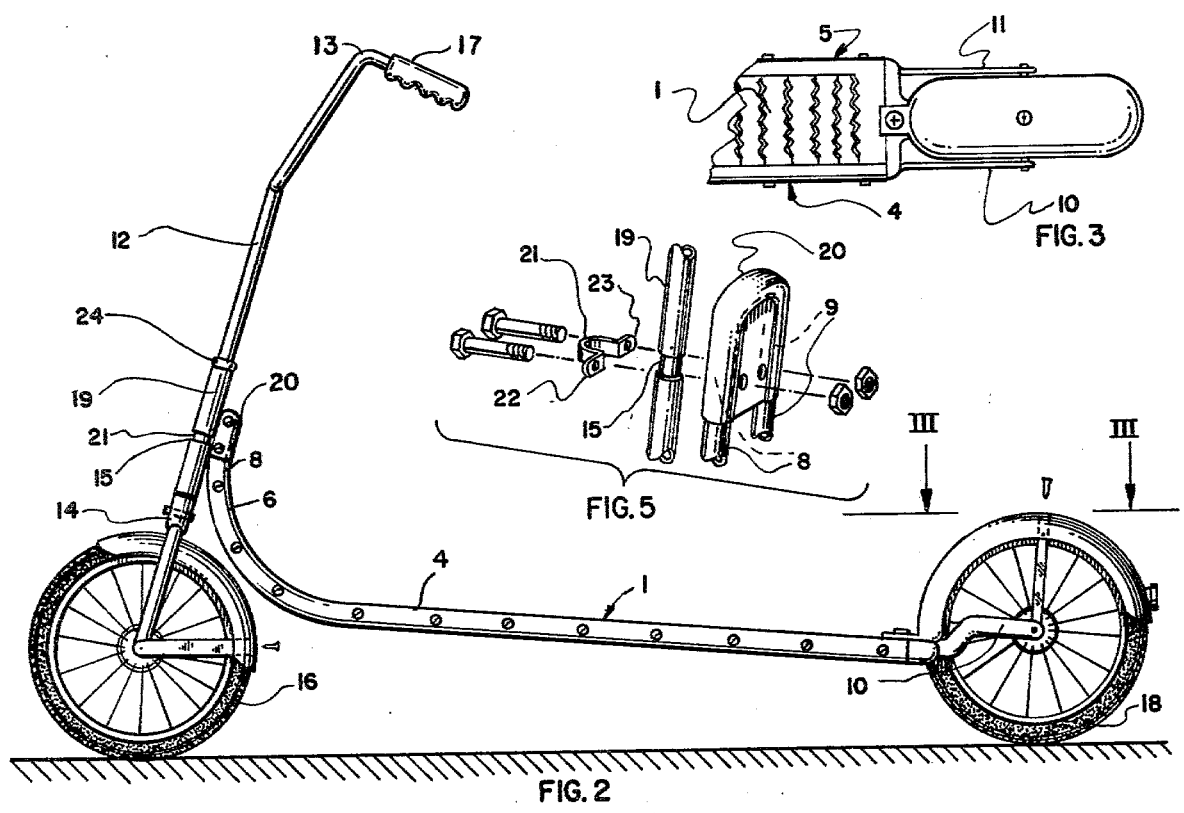

SCOOTER

BACKGROUND OF THE INVENTION

The present invention relates to a scooter.

Objects of the invention are to provide a scooter of simple structure, which is inexpensive in manufacture, and functions efficiently, effectively and reliably as a quietly operating scooter for the pleasure of children in outdoor activities. The scooter of the invention provides considerable enjoyment to children using it, and is favorable to adults who are annoyed by the considerable noise produced by known types of scooters and similar toys.

Scooters are disclosed in the following United States patents: U.S. Pat. No. 1,689,916, issued Oct. 30, 1928 to Fischer, U.S. Pat. No. 1,701,410, issued Feb. 5, 1929 to Hornquist, U.S. Pat. No. 2,460,395, issued Feb. 1, 1949 to Reid, U.S. Pat. No. 2,486,689, issued Nov. 1, 1949 to Tibores et al, U.S. Pat. No. 3,006,659, issued Oct. 31, 1961 to Krasnoff et al and U.S. Pat. No. 3,052,481, issued Sept. 4, 1962 to Kaufman.

BRIEF DESCRIPTION OF THE DRAWINGS

In order that the invention may be readily carried into effect, it will now be described with reference to the accompanying drawings, wherein:

FIG. 1 is a perspective view of an embodiment of the scooter of the invention in use;

FIG. 2 is a side view, on an enlarged scale, of the embodiment of FIG. 1;

FIG. 3 is a top view, taken along the lines III—III, of FIG. 2;

FIG. 4 is a view, partly in section, on an enlarged scale, of the coupling of the steering shaft to the front wheel of the scooter of the invention;

FIG. 5 is an exploded cross-sectional view, on an enlarged scale, of the coupling device of the scooter of the invention; and FIG. 6 is a perspective view, on an enlarged scale, of a bracket of the steering shaft of the scooter of the invention.

DETAILED DESCRIPTION OF THE INVENTION

The scooter of the invention comprises a board-like platform 1 (FIGS. 1 to 3) having spaced opposite front and rear ends 2 and 3, respectively (FIG. 1), and a pair of side strips 4 and 5 affixed to opposite length-extending edges of said platform, as shown in FIGS. 1 and 3. The side strips 4 and 5 are curved in a slight arcuate upturn 6 and 7, respectively, extending from the front end 2 of the platform 1, as shown in FIG. 1. The side strips 4 and 5 have free front ends 8 and 9, respectively (FIG. 5), substantially perpendicular to the plane of the platform 1, but spaced in front of said platform, as shown in FIGS. 1 and 5.

The side strips 4 and 5 also extend from the rear end 3 of the platform to a distance therebeyond, as shown in FIGS. 2 and 3, wherein the rear extending portions 10 and 11 of the side strips 4 and 5, respectively, are shown in FIG. 3.

A steering shaft 12 (FIGS. 1, 2, 4 and 5) has spaced opposite top and bottom ends 13 and 14, respectively (FIGS. 1 and 2). The steering shaft 12 has an annular indentation 15 formed therein in the area of the bottom end 14 thereof, as shown in FIGS. 2, 4 and 5.

A front wheel 16 is rotatably mounted at the bottom end 14 of the steering shaft 12, as shown in FIGS. 1 and 2.

Handle bars 17 are affixed to the top end 13 of the steering shaft 12.

A rear wheel 18 (FIGS. 1 and 2) is rotatably mounted between the rear extending portions 10 and 11 of the side strips 4 and 5, respectively.

Actually, the annular indentation 15 is not formed in the steering shaft 12, but is actually formed in a sleeve 19 coaxially positioned around said steering shaft, as shown in FIGS. 1, 2, 4 and 5.

In accordance with the invention, a coupling device, shown in detail in FIG. 5, couples the sleeve 19 of the steering shaft 12 to the side strips 4 and 5. The coupling device comprises a pocket-like housing member 20 (FIGS. 1, 2 and 5) accommodating the free front ends 8 and 9 of the side strips 4 and 5, respectively, and enclosing said side strips and the area between the front ends thereof, as shown in FIG. 5. The coupling device further comprises a substantially U-shaped bracket 21 (FIGS. 1, 2 and 5) having a pair of spaced free ends 22 and 23, as shown in FIG. 5. The bracket member 21 is accommodated in the indentation 15 in the sleeve 19 of the steering shaft 12, in the manner shown in FIGS. 1 and 2, passes around said sleeve, and is affixed at its free ends to the housing member 20, as shown in FIGS. 1 and 2.

A bracket 24 (FIGS. 2 and 6) is provided around the steering shaft 12 at the top of the sleeve 19.

While the invention has been described by means of a specific example and in a specific embodiment, I do not wish to be limited thereto, for obvious modifications will occur to those skilled in the art without departing from the spirit and scope of the invention.

I claim:

1. A scooter, comprising
a board-like platform having spaced opposite front and rear ends and a pair of side strips affixed to opposite lengthextending edges of said platform, said side strips being curved in a slight arcuate upturn extending from the front end of the platform and having free front ends substantially perpendicular to the plane of the platform but spaced in front of said platform, said side strips extending from the rear end of said platform to a distance therebeyond;
a steering shaft having spaced opposite top and bottom ends;
a sleeve coaxially surrounding said shaft and an annular indentation formed in said sleeve in the area of the bottom end of said shaft;
a front wheel rotatably mounted at the bottom end of the steering shaft;
handle bars affixed to the top end of the steering shaft;
a rear wheel rotatably mounted between the side strips at the rearmost parts of said side strips; and
coupling means for coupling the sleeve of the steering shaft to said side strips, said coupling means comprising a pocket-like housing member accommodating the free front ends of said side strips and enclosing said side strips and the area between the front ends thereof and a substantially U-shaped bracket member having a pair of spaced free ends, said bracket member being accommodated in the indentation in said sleeve of said steering shaft, passing around said sleeve and being affixed at its free ends to said housing member.

2. A scooter as claimed in claim 1, wherein said platform has a predetermined width and said side strips are curved in a slight arcuate upturn extending from the front end of said platform and toward each other and having free front ends substantially perpendicular to the plane of said platform but spaced in front of and above said platform at a distance from each other smaller than said predetermined width.

* * * * *